United States Patent
Boulton (10) Patent No.: US 11,347,865 B2
(45) Date of Patent: May 31, 2022

(54) DETERMINING SECURITY RISKS IN BINARY SOFTWARE CODE

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 329 days.

(21) Appl. No.: 16/370,738

(22) Filed: Mar. 29, 2019

(65) Prior Publication Data

US 2020/0311281 A1 Oct. 1, 2020

(51) Int. Cl.
*G06F 21/00* (2013.01)
*G06F 21/57* (2013.01)
*G06F 21/55* (2013.01)

(52) U.S. Cl.
CPC .......... *G06F 21/577* (2013.01); *G06F 21/552* (2013.01); *G06F 2221/033* (2013.01)

(58) Field of Classification Search
CPC . G06F 21/577; G06F 21/552; G06F 2221/033
See application file for complete search history.

(56) References Cited

U.S. PATENT DOCUMENTS

| 8,099,596 B1 * | 1/2012 | Rusakov | G06F 21/53 |
| | | | 713/164 |
| 9,268,956 B2 * | 2/2016 | Anakata | G06Q 50/265 |
| 9,465,942 B1 * | 10/2016 | Kane-Parry | G06F 21/57 |
| 2004/0230835 A1 | 11/2004 | Goldfeder et al. | |
| 2009/0063867 A1 * | 3/2009 | Granados | G06F 21/125 |
| | | | 380/28 |
| 2010/0235918 A1 * | 9/2010 | Mizrahi | H04L 63/1416 |
| | | | 726/25 |
| 2012/0240229 A1 * | 9/2012 | Sobel | G06F 21/564 |
| | | | 726/24 |
| 2013/0227683 A1 * | 8/2013 | Bettini | G06F 21/53 |
| | | | 726/22 |
| 2019/0050576 A1 | 2/2019 | Boulton | |

OTHER PUBLICATIONS

Extended European Search Report issued in European Application No. 20161046.6 dated May 26, 2020, 7 pages.
Communication Pursuant to Article 94 (3) EPC issued in European Application No. 20161046.6 dated Nov. 23, 2021, 6 pages.

* cited by examiner

*Primary Examiner* — Ghazal B Shehni
(74) *Attorney, Agent, or Firm* — Fish & Richardson P.C.

(57) ABSTRACT

Systems, methods, and software can be used to analyze security risks of a binary software code. In some aspects, a computer-implemented method comprises: receiving, by at least one hardware processor, a binary software code; determining, by the at least one hardware processor, a security risk value for each of a plurality of security risk factors of the binary software code; for each of the plurality of security risk factors, determining, by the at least one hardware processor, a security confidence level of the respective security risk factor; and generating, by the at least one hardware processor, a security notification, wherein the security notification includes the security confidence levels corresponding to the plurality of security risk factors.

17 Claims, 2 Drawing Sheets

US 11,347,865 B2

DETERMINING SECURITY RISKS IN BINARY SOFTWARE CODE

TECHNICAL FIELD

The present disclosure relates to determining security risks in binary software code.

BACKGROUND

In some cases, software services can be provided by executable binary software code. The binary software code is computer software in a binary format. The computer software can be application software, system software (e.g., an operating system or a device driver), or a component thereof.

The binary software code can be in a configuration of object code, executable code, or bytecode. An object code is the product of compiler output of a sequence of statements or instructions in a computer language. Computer programs can be written with source code that is logically divided into multiple source files. Each source file is compiled independently into a corresponding object file that includes object code. The object codes in the object files are binary machine codes, but they may not be ready to be executed. The object files can include incomplete references to subroutines outside itself and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation, or it may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

DESCRIPTION OF DRAWINGS

Like reference numbers and designations in the various drawings indicate like elements.

DETAILED DESCRIPTION

In some cases, a software developer can submit software code to a software service platform that is operated by a software provider. The software code can be executed on the software service platform to provide software services to user devices. Alternatively or additionally, the software code can be downloaded to user devices. The software service platform can be implemented in one or more servers, or on a cloud-computing platform.

The security of the binary software code can be determined based on many factors. Examples of these factors include the number of insecure network accesses performed by the binary software code, the number of open source software (OSS) components included by the binary software code, the number of insecure application program interfaces (APIs) invoked by the binary software code, the number of exception handling routines included in the binary software code, the number of defensive routines inserted by a compiler during the compilation of the binary software code, the number of code obfuscation routines used by the binary software code, the number of string handling functions performed by the binary software code, the types of cryptography operations performed by the binary software code. In some implementations, the binary software code can be analyzed based on these different aspects of security risk factors. Security scores can be calculated to indicate the risk levels of these aspects. These security scores can be compared with different configured thresholds to indicate whether each of these aspects are safe or unsafe. In some implementations, these security scores and safety indicators can be aggregated to generate a security label. The security label can present the security risks of these different security aspects using graphic design objects. The security label can be attached to the binary software code, e.g., posted on a package or displayed next to the binary software code. This approach can provide an intuitive presentation for users of the binary software code to understand the security risks in these different aspects. FIGS. 1-4 and associated descriptions provide additional details of these implementations.

Figure 1:
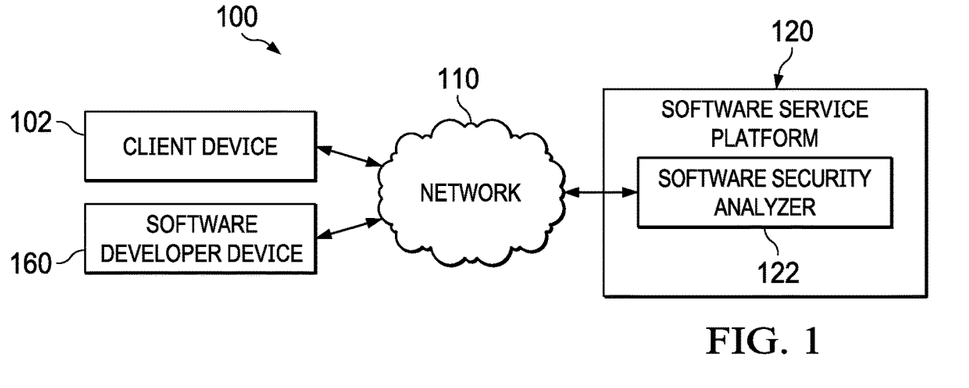
FIG. 1 is a schematic diagram showing an example communication system that determines security risks of binary software code, according to an implementation.

FIG. 1 is a schematic diagram showing an example communication system 100 that determines security risks of binary software code, according to an implementation. At a high level, the example communication system 100 includes a client device 102, a software developer device 160, and a software service platform 120 that are communicatively coupled with a network 110.

The software developer device 160 represents an application, a set of applications, software, software modules, hardware, or any combination thereof, that can be configured to submit the binary software code to the software service platform 120. The binary software code can be downloaded to the client device 102 to be exacted on the client device 102. The binary software code can also be executed on the software service platform 120 to provide software service to the client device 102. Examples of the software services can include software as a service (SaaS) applications such as SALESFORCE, OFFICE 365, or other software application services.

Figure 2:
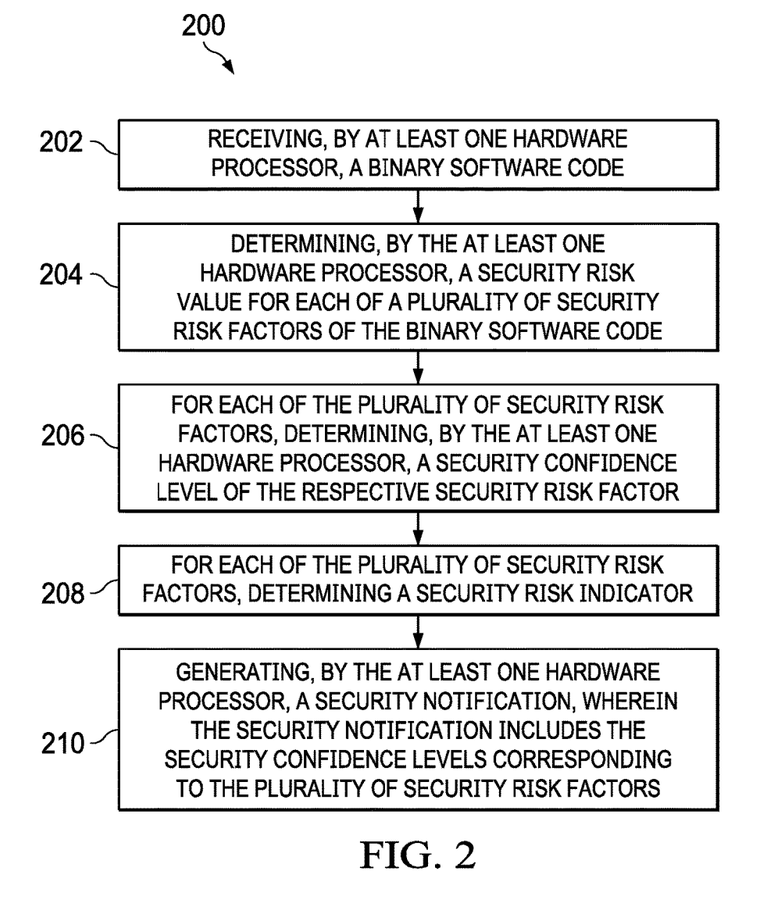
FIG. 2 is a flow diagram showing an example method that determines security risks of binary software code, according to an implementation.
Figure 3:
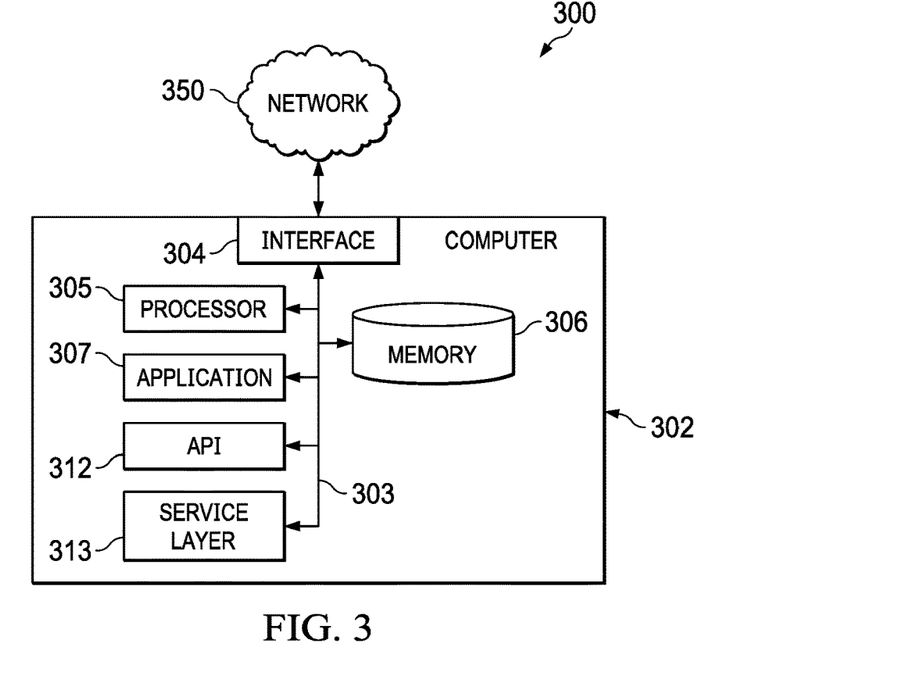
FIG. 3 is a high-level architecture block diagram of a computing system, according to an implementation.
Figure 4:
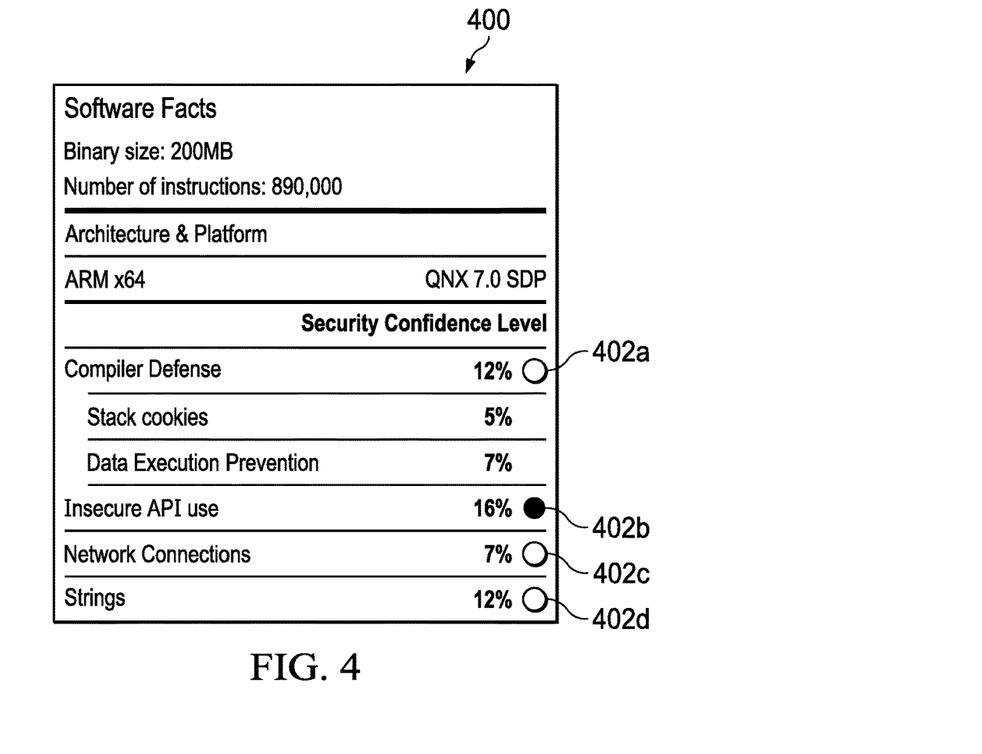
FIG. 4 is a schematic diagram showing an example security label, according to an implementation.

The software service platform 120 includes a software security analyzer 122. The software security analyzer 122 represents an application, a set of applications, software, software modules, hardware, or any combination thereof, that can be configured to analyze software code for security risks. In some implementations, the software security analyzer 122 can determine a security risk value for each security risk factor, as well as the corresponding security confidence level and the corresponding security risk indicator. The software security analyzer 122 can also generate a security label representing this information. FIGS. 2-4 and associated descriptions provide additional details of these implementations.

The software service platform 120 can be implemented using one or more computers, computer servers, or a cloud-computing platform.

The client device 102 represents a device that can use the binary software code. In some cases, the binary software code can be installed on the client device 102, e.g., by downloading over the network 110 or copying locally onto the client device 102. Alternatively, the client device 102 can access a software service provided by the binary software code. In one example, a browser or a client application can be executed on the client device 102 to communicate service requests and service responses with the software service platform 120 to obtain software services.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or a combination thereof that can be configured to transmit data messages between the entities in the system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that determines security risks of binary software code, according to an implementation. The method 200 can be implemented by a software service platform, e.g., the software service platform 120 shown in FIG. 1. The method 200 shown can also be implemented using additional, fewer, or different entities. Furthermore, the method 200 can be implemented using additional, fewer, or different operations, which can be performed in the order shown or in a different order.

The example method 200 begins at 202, where a binary software code is received. In some cases, the binary software code is received at a software service platform. In one example, the binary software code can be submitted to the software service platform by a software developer, over a network. The binary software code can represent an application software, a system software (e.g., an operating system or a device driver), or a component thereof. The binary software code can be received without the corresponding source code of the software.

At 204, the software service platform determines a security risk value each of a plurality of security risk factors of the binary software code. Examples of the security risk factors can include a network connection factor, an open source software (OSS) factor, an application program interface (API) factor, a string factor, an exception handling factor, a complier defense factor, a code obfuscation factor, a cryptography factor. The security risk factors can also include a code smell factor. In some cases, a source code corresponding to the binary software code can be obtained by using a disassembler, a decompiler, or both. The source code can be analyzed to determine if the code includes any code smells. Code smells are structures in the code that indicate violation of design principles and negatively impact design quality of the code. Examples of code smells include duplicated code (i.e. identical or very similar codes that exit in different locations of the software application code), contrived complexity, shotgun surgery, class-level smells and method-level smells. The presences of the code smells can introduce security risks to the code. The software service platform can determine the code smell factor based on the number of code smells in the source code.

The network connection factor represents the security risk caused by network access to network addresses. In some implementations, the software service platform can determine the network addresses that are accessed by the binary software code by scanning the binary software code to identify text strings that are encoded in the binary software code. The scanning can be performed based on one or more encoding protocols. Examples of the encoding protocols include the American Standard Code for Information Interchange (ASCII) encoding protocol or the Unicode protocol. A text string includes one or more consecutive text characters. Examples of the text characters include alphabetic letters, numbers, punctuation marks, and symbols. In some cases, a text character can also be referred to as an alphanumeric character. Each text character is encoded into a binary number according to an encoding protocol. The size of the binary number can be 8 bits (1 byte), 16 bits (2 bytes), 32 bits (4 bytes), or 64 bits (8 bytes). For example, in ASCII protocol, the lower case letter "a" is encoded as 0x61, or "01100001" in binary number. In an encoding protocol, text characters are defined within a range of binary numbers. Therefore, by scanning the byte stream of the binary software code to check the values of each byte, two bytes, four bytes, or eight bytes (depending on the size of binary number of the encoding protocol), different text characters can be identified. For text characters that appear consecutively in the binary software code, these text characters form a text string. In some cases, the scanning can be performed from the beginning of the binary software code (forward scanning), from the end of the binary software code (backward scanning), or from both the beginning and the end of the binary software code (parallel scanning).

In some cases, the identified text strings that are encoded in the binary software code can be used to determine one or more network addresses at which the binary software code may perform a network communication. For example, the text strings can include an email address or a Uniform Resource Locator (URL). These text strings can be identified based on a specific character or a specific character string. For example, an email address can be identified by the "@" character in the text string. A URL can be identified by the "HTTP," "HTTPS," or "FTP" characters in the text string. If such a specific character or character string is found in the text strings, the text strings can be parsed to determine a network address. For example, the portion of the text string after the specific character "@" can represent a network address of an email server. The portion of the text string after the specific character string "HTTPS" or "HTTP" can represent a network address of a web server. In one example, the portion of the text string that represents the network address can be in numerical form, e.g., an Internet Protocol (IP) v4 or v6 address. In another example, the portion of the text string that represents the network address can be in letter form, e.g., a Domain Name System (DNS) address that can be translated into an IP address by a DNS server.

In some implementations, the software service platform can determine a configuration of the binary software code. The configuration of the binary software code can be object code, executable code, or bytecode. In some cases, the software developer can submit the binary software code in the configuration of object code. In these cases, the binary software code can be a collection of multiple object files that are compressed into one archive file, e.g., a zip file. Alternatively, the software developer can perform the link process and submit the executable file containing executable code. In some cases, e.g., if the binary software code was developed using JAVA, the software developer can submit the binary software code in a bytecode configuration. The software service platform can determine the configuration based on the types of the file in which binary software code is submitted. For example, if the binary software code is submitted in a zip file, the software service platform can determine that the binary software code is in an object code configuration. If the binary software code is submitted in an .exe file, the software service platform can determine that the binary software code is in an executable code configuration. Alternatively or in combination, the software service platform can determine the configuration by scanning the first few bytes of the binary software code. The first few bytes of the binary software code can be the header, which stores configuration information of the binary software code.

In some cases, based on the determined configuration, the software service platform can further extract a segment of the binary software code that stores constant values used by the binary software code. For example, if the binary software code is in the object code configuration, the software service platform can decompress the binary software code to obtain a collection of object files. The collection of object files can include a data segment, in some cases stored as a .data or a .h file, that stores constant values. Therefore, the software service platform can locate the data segment by searching for .data or .h file in the collection of object files. In some cases, there can be more than one data segments in the binary software code.

If the binary software code was developed using JAVA, the binary software code may be in a bytecode configuration. In these cases, the configuration information in the header of the binary software code can indicate information of one or more constant tables that store constants used by the binary software code. The information can include locations of the constant tables and the numbers of entries in the constant tables. Based on the configuration information, the software service platform can extract the constant tables from the binary software code.

If the software service platform extracts data segments that include the constant values, the software service platform can scan these data segments to identify network addresses used by the binary software code. Comparing to scanning the entire binary software code for network addresses, this approach simplifies the scanning process, and therefore saves time and computing resources. In some cases, e.g., the binary software code is submitted in an executable file and the binary software code was developed using native languages such as C, the software service platform may not be able to extract these data segments. In these cases, the software service platform can scan the entire binary software code to determine network addresses that are accessed by the binary software code.

In some implementations, in addition to, or as an alternative to, the scanning of the binary software code, the binary software code can be disassembled into assembly code. The assembly code can be parsed into different assembly instructions. The software service platform can search the assembly instructions to determine network addresses that are accessed by the binary software code.

For each of the determined network addresses, the software service platform determines whether an insecure network protocol is used to access the network address. The software service platform can determine the network protocol used to access the network address based on the text string found for the network address discussed previously.

The text string can include a set of specific characters that represent the network protocol used to access the network address. Examples of the set of specific characters can include "HTTP," "HTTPS," "FTP," "FTPS," "STFP," which indicates that Hypertext Transfer Protocol (HTTP), Hypertext Transfer Protocol Secure (HTTPS), File Transfer Protocol (FTP), File Transfer Protocol Secure (FTPS), and Secure File Transfer Protocol (SFTP) are used, respectively. Among these network protocols, examples of insecure network protocols include HTTP and FTP, while examples of secure network protocols include HTTPS, FTPS, and SFTP. In some cases, a list of secure and insecure network protocols can be stored at the software service platform. The software service platform can determine whether a network protocol is secure or insecure based on the list.

The software service platform can determine the security risk value for the network connection factor based on the number of instances that the insecure network protocols are used to access these network addresses. In some cases, the security risk value can be set to the number of instances that the insecure network protocols are used. Alternatively or in combination, the security risk value can be set by converting the number of instances that the insecure network protocols to one of a configured value (e.g., an integer value between 1 to 100) by comparing the number of instances to different thresholds corresponding to these configured values. In some cases, different insecure network protocols may have different weights, and the security risk value can be set based on the number of instances for the insecure network protocols in accordance with their respective weights.

Alternatively, the software service platform can determine the security risk value for the network connection factor based on accessing to insecure network addresses. In some implementations, the software service platform can store or otherwise has access to a list of insecure network addresses. The software service platform can compare the network addresses that are accessed by the binary software code with the list of the insecure network addresses, and determine the number of instances that insecure network addresses are accessed by the binary software code. The software service platform can determine the security risk value for the network connection factor based on the number of instances that insecure network addresses are accessed, the number of insecure network addresses that are accessed, or a combination thereof. As discussed previously, the security risk value for the network connection factor can be set based on the number of accesses, weights of different insecure network addresses, or a combination thereof.

In some cases, the security risk value for the network connection factor can be determined based on a combination of network accesses to insecure network address and network accesses using insecure network protocols. For example, the security risk values for network accesses to insecure network address and network accesses using insecure network protocols can be determined separately, and combined using statistics functions such as taking average, taking the maximum or minimum value, or other methods.

The OSS factor represents the security risk caused by the incorporation of OSS components in the binary software code. In some implementations, an OSS component can be included in the binary software code by including the contents, i.e., the code, of the OSS component. Alternatively or in combination, an OSS component can be included in the binary software code by including a functional call or a link to the OSS components. In some implementations, the software service platform can include an OSS depository that stores or links to software developed by different OSS projects.

Different OSS components can be developed under different OSS projects, which may maintain different levels of security quality for their software. Furthermore, as the public interests in an OSS project change, the level of commitments from public developers would also change. As a result, the security quality of the software code developed by the OSS project will change accordingly.

As discussed previously, the software service platform can scan the binary software code to determine text strings included in the binary software code. In some implementations, the software service platform can store or otherwise have access to a list of keywords that correspond to different OSS projects. The software service platform can identify an OSS component in the binary software code by matching the text strings the binary software code with these keywords. Example of the keywords can include words or a string of characters indicating one or more following characters of an OSS projects: network addresses, files paths, file names, package names, constants, logging statements, output notification (e.g., information that is displayed on a user interface). For example, the OSS projects can be APACHE, JSOUP, or GSON. The key words for these OSS projects can be character strings of "org.apache.commons.io," "org.jsoup," and "com.google.code.gson," respectively.

The software service platform can determine the security risk value for the OSS factor based on the security scores of the OSS components in the binary software code. The security score for each OSS component is determined based on the OSS project that develops the software for the OSS component. In some cases, the security score can be the same for different OSS developed by the same OSS project based on the security assessment of the OSS project. Alternatively, the security score for different OSS developed by the same OSS project can be different, based on the security assessment of the OSS project and the security assessment of the particular OSS component that is available.

In some cases, the security score for an OSS component can be determined based on several sub-factors. One example sub-factor can be a Common Vulnerabilities and Exposures (CVE) score. The CVE system provides a reference-method for publicly known information-security vulnerabilities and exposures for different products. Accordingly, software developed by the OSS project can have a CVE score that indicates the level of vulnerability of the software. In some cases, the CVE score for the particular OSS component can be used. Alternatively, e.g., if the CVE score for the particular OSS component is not available, the CVE score for the OSS project can be used. In some cases, the CVE score for an OSS project can be calculated by obtaining an average of the CVE scores of software developed by the OSS project. The CVE score is published by the CVE system. In some implementations, the software service platform can query a server to obtain the CVE score of an OSS project, an OSS component, or a combination thereof.

Another example sub-factor can be an update duration. OSS is more likely to be vulnerable to attacks if it has been released in public for a long time without being updated. The update duration can be the duration from the date that the most recent version of the OSS component is committed to the present time, the date that the most recent patch for the OSS component is released to the present time, or a combination of both.

In some cases, the update duration can be scaled based on the duration of existence of the OSS component. In one implementation, the update duration factor is calculated by dividing the update duration (e.g., in unit of days) by the existence duration (e.g., in units of days) of the OSS component. This approach provides a relative indication of the update frequency of the OSS component, which may more accurately reflect the security risk of the OSS component.

In some cases, the duration information, e.g., the release date, the patch date, and the first published date, of the OSS component are published by the OSS project that develops the OSS component. The duration information can be included in metadata, manifest, or other supplemental files that are included or associated with the OSS component. The software service platform can obtain the duration information and calculate the update duration factor.

Another example sub-factor can be the development environment of the OSS component. Examples of the development environment can include the type of the software language that is used to develop the OSS component, the operating system (OS) in which the OSS component is targeted, the computing processor that is compatible with the OSS component, the hardware that is associated with the OSS component, or any combinations thereof. For example, some software languages (e.g., JAVA) include more sophisticated mechanisms of memory management, and thus are less susceptible to certain types of attack than software languages (e.g., C/C++) that do not include similar mechanisms. In some cases, information of the development environment of an OSS component can be included in the metadata, the manifest, or other supplemental files that are included or associated with the OSS component. Therefore, the software service platform can obtain the information of the development environment and assess an environmental factor accordingly.

Another example sub-factor can be the complexity factor. In some cases, an OSS component can have dependencies on other OSS components. For example, an OSS component can invoke a library that is developed by another OSS project. In these cases, the security of the OSS component may depend on the other OSS components that are invoked by the OSS component. In some implementations, the complexity factor can be evaluated based on the number of other OSS components that are invoked by the OSS component to be assessed. Alternatively, the complexity factor of a particular OSS component can be evaluated based on the security scores of the OSS components that the particular OSS components depend on. For example, if an OSS component invokes multiple OSS components, the security score of the least secure OSS components that are invoked by the OSS component can be used as the complexity factor.

In some implementations, the software service platform can determine the security score of the OSS component by combining these or other factors. For example, the security score can be determined by taking an average, a weight average, a minimum, a maximum, or any other statistical measures of mathematical operations of these factors.

The software service platform can further determine the security risk value of the OSS factor by combining the security scores of different OSS components included in the binary software code. For example, the security score can be determined by taking an average, a weight average, a minimum, a maximum, or any other statistical measures of mathematical operations of these security scores.

The API factor represents the security risk caused by invoking of insecure API. As discussed previously, the software service platform can disassemble the binary software code into assembly code. The software service platform can extract the assembly instructions that invoke APIs from the assembly code. The software service platform can store or otherwise have access to a list of insecure APIs. In some cases, the list of insecure APIs can be set based on software security standards. One example of software security standards is Motor Industry Software Reliability Association (MISRA) standard. MISRA is an organization that produces guidelines for the software developed for electronic components used in the automotive industry, including insecure software practices such as insecure API or instructions. Examples of insecure APIs include assembly instructions that perform memory handling functions. Based on the list of insecure APIs, the software service platform can determine the usages of insecure API by the binary software code and determine a security risk value for the API factor. Similarly to what have discussed previously regarding other factors, the software service platform can set the security risk value based on the number of instances that insecure APIs are used, the number of insecure APIs used, the weight of different insecure APIs, or any combination thereof, by taking an average, a weight average, a minimum, a maximum, or any other statistical measures of mathematical operations.

The string factor represents the security risk caused by handling strings. String handling operations may create memory leak and introduce security vulnerabilities to the code. As discussed previously, the software service platform can disassemble the binary software code into assembly code. The software service platform can determine the number of instances that strings handling operations are performed by scanning the assembly code and search for string handling instructions. Example of the string handling instructions include strcpy. Similarly to what have discussed previously regarding other factors, the software service platform can set the security risk value for the string factor based on the number of instances that string handling instructions are used, the weight of different string handling instructions, or any combination thereof, by taking an average, a weight average, a minimum, a maximum, or any other statistical measures of mathematical operations.

The exception handling factor represents the security assessment based on the number of exception handling routines used by the binary software code. Exception handling routines generally provides a more secure way to develop software instructions. The software service platform can determine the number of instances that exception handling routines are used by disassembling the binary software code, and extracting exception handling routines from the assembly code. The software service platform can assign the security risk value of the exception handling factor based on the number of instances that exception handling routines are used. Unlike some of the other factors discussed previously (e.g., the network connection factor, the OSS factor, and the API factor), a higher security risk value of the exception handling factor indicates that the binary software code is more secure.

The compiler defense factor represents the security risks introduced by the complier that compiles the binary software code. In some operations, the compiler may add non-functional features to the binary software code during compilation. These non-functional features can include security routines that can increase the security of the binary software code. Examples of the these non-functional features include stack cookies and data execution preventions. In some implementations, the stack cookies and data execution prevention can be added to the software code by the compiler, the developer, or a combination thereof. Other examples of non-functional features include certificate checking features that prevent the man in the middle attacks, and runtime access controls. The software service platform can determine the number of these additional security features by disassembling the binary software code, and extracting the routines of these security features from the assembly code. The software service platform can assign the security risk value of the compiler defense factor based on the number of the security routines that are introduced by the complier. Like the exception handling factor discussed previously, a higher security risk value of the compiler defense factor indicates that the binary software code is more secure.

The cryptography factor represents the security assessment of the cryptographic operations performed by the binary software code. The software service platform can determine the cryptographic operations performed by the binary software code by disassembling the binary software code and scanning the assembly code for cryptographic routines. The software service platform can set the security risk value of the cryptography factor based on type of security protocols used, the size of encryption and authentication keys used, the types of certificate used, or any combinations thereof.

The code obfuscation factor represents the security risks of the cryptographic operations performed by the binary software code. In software development, obfuscation is the act of creating source or machine code that is difficult for humans to understand. Programmers may deliberately obfuscate code to conceal its purpose (security through obscurity) or its logic or implicit values embedded in it. This can be done manually or by using an automated tool. One advantage of automated code obfuscation is that it helps protect the trade secrets (intellectual property) contained within software by making reverse-engineering a program difficult and economically unfeasible. Other advantages might include helping to protect licensing mechanisms and unauthorized access, and shrinking the size of the executable. On the other hand, obfuscation can be used to hide malicious code, increase the difficulty and effectiveness of testing and vulnerability detecting procedures, or become an indicator that malicious intruders would aim to attack. The software service platform can disassemble the binary software code and determine the number and types of obfuscation code by scanning the assembly code and searching for assembly instructions or sequences of assembly instructions that are used for code obfuscation. The software service platform can assign the security risk value of the code obfuscation factor based on the number and the types of obfuscation code discovered in the assembly code. In some cases, a higher security risk value of the code obfuscation factor can indicate that the binary software code is less secure.

At 206, a security confidence level for each security risk factor is determined. A security confidence level represent the level of security of the binary software code with respect to the security risk factor. In one implementation, the security confidence level can be presented in a percentage term. A base number for each security risk factor can be configured, and the security confidence level for that security risk factor can be determined by calculating a ratio between the security risk value of the security risk factor with the base number of that security risk factor. In one example, the security risk value of the network connection factor is 10, indicating 10 network accesses to insecure network addresses or by insecure network protocols. The base number of the network connection factor is configured at 20. The security confidence level is thus 10/20× 100%=50%. The base number for different security risk factors can be configured by an admin or an organization associated with software developer or the software service platform. Different base numbers can be configured for different size of types of binary software code. For example, the base number for a driver software controlling a component on an automotive platform may be different than the base number for an app executing on a mobile device. In some cases, the software service platform can determine the type of the binary software code based on information submitted by the software developer along with the binary software code. The information can be included in a header, a configuration file, or other metadata of the binary software code. Alternatively or in combination, the software service platform can determine the type of the binary software code by extracting text strings from the binary software code and searching for keywords indicating the type of the binary software code.

At 208, a security risk indicator for each security risk factor is determined. The determination can be based on a comparison of the security risk value or the security confidence level with a threshold corresponding to that security risk factor. The threshold can represent a value below which the binary software code is considered to be safe. The threshold can be configured by an admin or an organization associated with software developer or the software service platform. Different thresholds can be configured for different size of types of software code. In some cases, the software service platform can adjust some or all of the thresholds automatically, e.g., based on the average, median, minimum, maximum, or other statistical measures of security risk values/security confidence levels determined for other binary software code of the same type, the same range of size, or both.

At 210, the software service platform generates a security notification. The security notification can include the security confidence levels for each security risk factor. In some cases, the security notification can include a security label as the security notification. The security label presents the security confidence levels in a graphic manner. FIG. 4 is a schematic diagram showing an example security label 400, according to an implementation. As illustrated, the security label listed each security risk factor and their corresponding security confidence level. In some cases, security confidence level for sub-factors of one or more security risk factors can also be included. For example, in addition to listing the security risk level 12% for complier defenses, indicating the number of defensive routines introduced by the compiler, the security label also includes security confidence levels for stack cookies and data execution preventions, indicating the number of these specific routines introduced by the compiler.

In some implementations, a graphic object can be included in the security label to represent the security risk indicator for each security risk factor. In the illustrated example, the security label 400 includes circles 402a, 402b, 402c, and 402d that are next to the security confidence levels. A color code can be used to indicate how these security confidence levels compared with the security thresholds configured for the respective security risk factors. For example, the circle 402b is displayed in red, indicating that the security risk indicator for the API factor is unsafe, i.e., the number of insecure API invoked by the binary software code exceeds the configured safety threshold. The other circles 402a, 402c, and 402d are displayed in green, indicating the security risk indicator for these factors are safe. In some cases, more than one thresholds can be configured for the security risk factor and thus the security risk indicator can take more than two values. For example, two thresholds can be configured for a security risk factor and the security risk indicator can be set to safe, neutral, or unsafe. In such a case, three color codes, e.g., red, green, yellow, can be used to represent these different values. Other graphic design effects, e.g., shape or shade, can be used to represent different values of security risk indicator. As discussed previously, for some security risk factors, a higher security confidence level may indicate a safer software code, while for other security risk factors, a lower security confidence level may indicate a safer software code. Therefore, using graphic design effects discussed previously to represent the security risk indicator can provide a uniform and intuitive presentation for users of the binary software code to understand the security risks in these different aspects.

In some cases, the security label can also include other generic facts of the binary software code. In the illustrated example, the security label 400 includes the size of the code, including e.g., the size of the binary software code in memory and the number of assembly instructions. The security label 400 also includes architecture and platform information of the binary software code. The architecture and platform information can include the hardware processor architecture that executes the binary software code, e.g., 64 bit Advanced RISC Machine (ARM) as shown in FIG. 4, the operating system in which the binary software code executes, e.g., the Quantum Software Systems (QNS) v7.0 as shown in FIG. 4, or a combination thereof. In some implementations, the software service platform can determine this information based on information submitted by the software developer with the binary software code, e.g., in a header, a configuration file, or other metadata associated with the binary software code. Alternative or in combination, the software service platform can determine some or all of these information based on scanning the binary software code and searching for text strings matching a list of keywords, disassembling the binary software code and analyzing the assembly code, or a combination thereof.

In some cases, in addition to or as an alternative to the security confidence level, the security label can include the security risk values for each security risk factor. The security label can further display, using graphic objects and design effects, the security risk indicator that is determined by comparing the security risk values with configured safety thresholds.

In some cases, the security label can also include information of different safety thresholds for one or more security risk factors. For example, the security label can list a value representing the threshold value of insecure network connections (or its corresponding security confidence level) under which the binary software code would be considered as safe.

While illustrated as a list in FIG. 4, the security label can also be generated using a pie chart or other graphic design objects.

In some cases, the security label can be generated in an image file. The security label can also be generated in a JavaScript Object Notation (JSON) script or other format that can be rendered on a graphic user interface (GUI). The security label can be sent to the software developer. The software developer can produce an image based on the security label and attach the image to the binary software code so that the image can be displayed with the binary software code, e.g., on a package or on a screen of an electronic device. Alternatively or in combination, the software service platform can generate the image and display the image along with the binary software code, so that the image can be displayed when user download the binary software code from the software service platform or access the software service platform to obtain software service provided by the binary software code.

In some cases, in addition to or as an alternative to sending the security label as the security notification, the software service platform can include the information displayed in the security label, e.g., the security confidence level and security risk indicator for different security risk factors, in the security notification. The software service platform can send the security notification to the software developer and the software developer can generate the security label based on this information.

In some cases, the software service platform can also send the security notification to a client device that downloads the binary software code. The security notification can be sent in the form of an image file, an image rendering script, a list of values of the security confidence level, security risk values, and security risk indicator for different security risk factors, or any combinations thereof. The client device can generate or render the image of security label accordingly. In some case, the client device can further compare the values of the security confidence level, security risk values, and security risk indicator for different security risk factors with one or more security policies configured at the client device. If any of these values violated the security policy, the client device can refrain from installing or executing the binary software code. Alternatively or in combination, the client device can trigger a notification to the user on a display of the client device, and requests a user input to confirm whether the binary software code is to be installed or executed.

While the steps of method 200 are discussed from the perspective of a software service platform, some or all of these steps can be implemented on other devices. For example, the steps of determining the security risk value, security confidence level, security risk indicator for different security risk factors, and generating the security label can be performed by any computing device that analyzes or executes the binary software code.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the software security analyzer 122 shown in FIG. 1. The computer 302 can also be used to implement other computing devices, e.g., the software developer device 160 or the client device 102 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a client device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350 (whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM), or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media, transitory or non-transitory, suitable for storing computer program instructions and data include all forms of non-volatile memory, media and memory devices, including by way of example, semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to, or represent, the functions of the web browser.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a transitory or non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A computer-implemented method, comprising: receiving, by at least one hardware processor, a binary software code; determining, by the at least one hardware processor, a security risk value for each of a plurality of security risk factors of the binary software code;
   for each of the plurality of security risk factors, determining, by the at least one hardware processor, a security confidence level of the respective security risk factor;
   generating, by the at least one hardware processor, a security notification, wherein the security notification comprises an image file of a security label image or a script file that renders the security label image, and the security label image comprises one or more graphic objects that indicate the security confidence levels corresponding to the security risk value for each of the plurality of security risk factors of the binary software code; and sending the security notification.

2. The method of claim 1, further comprising: for each of the plurality of security risk factors, determining a security risk indicator, wherein the security risk indicator indicates whether the security risk value or the security confidence level corresponding to the respective security risk factor exceeds a threshold.

3. The method of claim 2, further comprising: selecting a color code for each of the plurality of security risk factors, wherein the color code is selected based on the security risk indicator of the respective security risk factor.

4. The method of claim 1, wherein the security label image indicates a hardware processor platform or an operating system in which the binary software code executes.

5. The method of claim 1, wherein the plurality of security risk factors include a compiler defense factor, an application program interface (API) factor, an open source software (OSS) factor, an exception handling factor, a network connection factor, a code smell factor, a code obfuscation factor, a string factor, or a cryptography factor.

6. The method of claim 1, wherein the security confidence level is represented in a percentage format.

7. A server, comprising: at least one hardware processor; and one or more computer-readable storage media coupled to the at least one hardware processor and storing programming instructions for execution by the at least one hardware processor, wherein the programming instructions, when executed, cause the at least one hardware processor to perform operations comprising: receiving a binary software code; determining a security risk value for each of a plurality of security risk factors of the binary software code; for each of the plurality of security risk factors, determining a security confidence level of the respective security risk factor;
   generating a security notification, wherein the security notification comprises an image file of a security label image or a script file that renders the security label image, and the security label image comprises one or more graphic objects that indicate the security confidence levels corresponding to the security risk value for each of the plurality of security risk factors of the binary software code; and sending the security notification.

8. The server of claim 7, the operations further comprising: for each of the plurality of security risk factors, determining a security risk indicator, wherein the security risk indicator indicates whether the security risk value or the security confidence level corresponding to the respective security risk factor exceeds a threshold.

9. The server of claim 8, the operations further comprising: selecting a color code for each of the plurality of security risk factors, wherein the color code is selected based on the security risk indicator of the respective security risk factor.

10. The server of claim 7, wherein the security label image indicates a hardware processor platform or an operating system in which the binary software code executes.

11. The server of claim 7, wherein the plurality of security risk factors include a compiler defense factor, an application program interface (API) factor, an open source software (OSS) factor, an exception handling factor, a network connection factor, a code smell factor, a code obfuscation factor, a string factor, or a cryptography factor.

12. The server of claim 7, wherein the security confidence level is represented in a percentage format.

13. One or more non-transitory computer-readable media containing instructions which, when executed, cause a computing device to perform operations comprising: receiving, by at least one hardware processor, a binary software code; determining, by the at least one hardware processor, a security risk value for each of a plurality of security risk factors of the binary software code; for each of the plurality of security risk factors, determining, by the at least one hardware processor, a security confidence level of the respective security risk factor;

generating, by the at least one hardware processor, a security notification, wherein the security notification comprises an image file of a security label image or a script file that renders the security label image, and the security label image comprises one or more graphic objects that indicate the security confidence levels corresponding to the security risk value for each of the plurality of security risk factors of the binary software code; and sending the security notification.

14. The one or more computer-readable media of claim 13, the operations further comprising: for each of the plurality of security risk factors, determining a security risk indicator, wherein the security risk indicator indicates whether the security risk value or the security confidence level corresponding to the respective security risk factor exceeds a threshold.

15. The one or more computer-readable media of claim 14, the operations further comprising: selecting a color code for each of the plurality of security risk factors, wherein the color code is selected based on the security risk indicator of the respective security risk factor.

16. The one or more computer-readable media of claim 13, wherein the security label image indicates a hardware processor platform or an operating system in which the binary software code executes.

17. The one or more computer-readable media of claim 13, wherein the plurality of security risk factors include a compiler defense factor, an application program interface (API) factor, an open source software (OSS) factor, an exception handling factor, a network connection factor, a code smell factor, a code obfuscation factor, a string factor, or a cryptography factor.

* * * * *